United States Patent [19]

Goto et al.

[11] 4,212,733

[45] Jul. 15, 1980

[54] OIL-WATER SEPARATION FILTERS

[75] Inventors: Yuzuru Goto, Soka; Yukitaka Daigo, Kasukobe; Mikio Hitotsuyanagi, Soka, all of Japan

[73] Assignee: Somar Manufacturing Co., Ltd., Tokyo, Japan

[21] Appl. No.: 865,751

[22] Filed: Dec. 27, 1977

Related U.S. Application Data

[63] Continuation of Ser. No. 666,998, Mar. 15, 1976, abandoned.

[51] Int. Cl.$^2$ .............................................. C02B 9/02
[52] U.S. Cl. ..................................... 210/36; 210/40; 210/505; 210/DIG. 26; 428/297; 428/304
[58] Field of Search ............... 210/36, 40, 502–510, 210/DIG. 26, 242 AS; 428/237, 281, 283, 287, 297, 303, 304, 318, 481, 537

[56] References Cited

U.S. PATENT DOCUMENTS

| | | | |
|---|---|---|---|
| 3,252,270 | 5/1966 | Pall et al. | 210/505 |
| 3,862,963 | 1/1975 | Hoshi et al. | 210/DIG. 26 |
| 3,960,722 | 6/1976 | Tomikawa et al. | 210/DIG. 26 |

FOREIGN PATENT DOCUMENTS 50-142491 11/1975 Japan.
51-12461 1/1976 Japan.

*Primary Examiner*—Ivars C. Cintins
*Attorney, Agent, or Firm*—Sughrue, Rothwell, Mion, Zinn and Macpeak

[57] ABSTRACT

An oil-water separation filter, which comprises (1) a porous material comprising a sintered polyethylene powder bonded to (2) a fibrous layer having a thickness of about 0.5 to about 5 mm and a porosity of about 70 to about 90% comprising fibers having a water content of about 0.4 to about 5%, a critical surface tension of about 25 to about 45 dyne/cm and a fiber diameter of about 5 to about 30 $\mu$ or a mixture of the fibers and fibers having a water content of about 8 to about 15% and a fiber diameter of 5 to about 30 $\mu$.

12 Claims, No Drawings

OIL-WATER SEPARATION FILTERS

This is a continuation of application Ser. No. 666,998, filed Mar. 15, 1976, now abandoned.

BACKGROUND OF THE INVENTION

1. Field of the Invention:

This invention relates to a filter for separating and removing an oil contained in water.

2. Description of the Prior Art:

It is difficult to separate and remove an oil in water, especially an oil in the emulsified state, and in many cases water containing emulsified oils have been discharged into a sewer as such. Various attempts have been made to separate such an emulsified oil, for example, by standing, which comprises allowing water containing emulsified oils to stand for a long time in a storage tank, thereby separating the oils, by adsorbing, i.e., separating the oils using an oil-adsorbing layer, or by passing such water containing emulsified oils through a filter, thereby separating the oils as coarse particles. However, these methods suffer from various defects. For example, they require large apparatus or are of poor efficiency, or require high cost materials which are consumed in the process. Accordingly, factories handling machine oils, fuel oils, or vegetable oils have encountered substantial problems in preventing waste water containing oils from flowing into sewers. The disposal of oil-containing bilge water and cleaning water in ships has posed the same problem.

SUMMARY OF THE INVENTION

It is one object of this invention to provide a filter which permits continuous, efficient and simple separation and removal of oils from great quantities of water containing oils, thereby providing clear water having an extremely low oil content.

According to this invention, there is provided a filter for separating oils from water comprising a first filter layer of a porous material produced from a sinterable polyethylene powder, or a mixture of such a polyethylene powder and a powder of a heat-resistant organic or inorganic material, which is bonded to a second filter layer comprising a fibrous layer.

DESCRIPTION OF THE PREFERRED EMBODIMENTS

According to this invention, polyethylene powder having a viscosity average molecular weight of about 700,000 to about 4,000,000, or a mixture of polyethylene powder and an organic material such as a fluorine resin powder or a polyimide resin powder, or an inorganic material such as sintered clay, alumina, diatomaceous earth or activated carbon, which is used as a filler, is molded in a cylindrical or plate-like form, and sintered preferably at a temperature of about 220° to about 270° C., preferably 230° to 250° C., to form a first filter layer having a predetermined pore diameter and porosity.

Then, a fibrous layer, i.e., a second filter layer, comprising fibers having a water content of about 0.4 to about 5%, a critical surface tension of about 25 to about 45 dyne/cm and a fiber diameter of about 5 to about 30$\mu$, is bonded to the outer peripheral surface of a cylindrical first filter layer or to one of two surfaces having a maximum area of a plate-like first filter layer to form a filter of this invention.

When water containing oils are caused to flow from the first filter layer of this filter towards the second filter layer, the oils contained in the water separate from the water as large droplets. When the fibrous layer is likely to be separated by the pressure of the flowing water to cause fiber migration, the fibrous layer is preferably covered with a wire gauze of a coarse mesh finished with a rust-proof resin, to thereby prevent such a defect.

The function of the filter of this invention to separate oils from water is due to the first filter layer. However, this layer alone is insufficient, and in order to completely separate the oils, the filter must be of a composite structure consisting of a first filter layer and a second filter layer. When water containing oils pass through the fine pores of the sintered porous material as a first filter layer, the films covering the oil droplets are destroyed, and only the oils are retained and aggregated in the first filter layer due to the difference in wetting between the water and the oils toward the material of the first filter layer, whereby separation occurs. However, when the first filter layer is used alone, the separated oils come afloat along the surface of the first filter layer to cause a so-called froth or graping phenomenon (oil droplets can initially be seen in closely conteguous "grape-like" structures on the surface; they eventually come lose and float away from the surface), and the interface between the separated oils and the water becomes unstable. The characteristic feature of the filter of this invention is that the oil droplets separated in the first filter layer grow into large, stable oil droplets due to the second filter layer provided around or on top of the first filter layer, and then the oil droplets are released from the second filter layer and come afloat to form a stable interface between the oil and the water phase.

The porous material used as a constituent of the first filter layer of this invention can suitably be made from ultra-high molecular weight polyethylene powder. From the viewpoint of low hydrophilicity, resistances to water, oils and chemicals, and strength, polyethylene powder having a viscosity average molecular weight of about 700,000 to about 4,000,000, a density of about 0.94 to about 0.97 g/cc, a melt index of not more than about 0.01 dg/min., a melting point of about 130° to about 138° C. and a particle size of about 50 to about 200$\mu$ is suitable for use in this invention.

Organic or inorganic powders can be added as a filler to the polyethylene powder in an amount of about 5 to about 50% by weight, to thereby form various sintered porous materials having a layer thickness of about 16 mm, a porosity of about 50 to about 70% and a pore diameter of about 10 to about 60$\mu$ in a cylindrical or plate-like form. In the above, the sintering is carried out at a temperature of about 220° to about 270° C., preferably 230° to 250° C., for a period of about 70 to about 120 minutes, preferably 80 to 100 minutes, in air. The pore diameter and porosity of the sintered porous material formed are determined by the particle size distribution and amount of the filler used.

Examples of organic powders used in this invention include tetrafluoroethylene powder having a specific gravity of about 2.25 to about 2.29, an apparent specific gravity of about 300 to about 500 g/l and a particle size of about 5$\mu$ (more than 50% of the particles); and polyimide powder having a specific gravity of about 1.4, an apparent specific gravity of about 400 g/l and a particle size of about 5$\mu$ (more than 50% of the particles).

Examples of inorganic powders used in this invention include sintered clay having a specific gravity of about 2.5 to about 2.6 and a particle size of about 1 to about 5μ; activated carbon having a specific gravity of about 1.3 to about 1.5, a particle size of about 0.5 to about 2μ and a specific surface area of about 700 to about 1,300 m²/g; diatomaceous earth having a specific gravity of about 1.98 to about 2.30 and a particle size of about 3 to about 40μ; alumina having a specific gravity of about 3.7 to about 3.9 and a particle size of about 30 to about 150μ; calcium carbonate having a specific gravity of about 2.7 to about 2.8 and a particle size of about 1 to about 50μ; magnesium carbonate having a specific gravity of about 2.8 to about 2.85 and a particle size of about 40 to about 150μ; and magnesium hydroxide having a specific gravity of about 2.38 to about 2.39 and a particle size of about 40 to about 75μ.

Sodium chloride having a particle size of about 400μ can also be added to the polyethylene powder in an amount of about 40 to about 80% by weight, and sintered in a cylindrical or plate-like form at a temperature of about 220° to about 270° C., preferably 230° to 250° C., for a period of about 70 to about 120 minutes, preferably 80 to 100 minutes, in air, followed by washing with water to dissolve the sodium chloride, to thereby form various porous materials having a layer thickness of about 16 mm, a porosity of about 60 to about 80% and a pore diameter of about 50 to about 60μ. The porosity and pore diameter of the porous material formed are determined by the amount of sodium chloride added.

Moreover, an inorganic foaming agent such as sodium bicarbonate having a particle size of about 30 to about 100μ or antimony bicarbonate having a particle size of about 50 to about 200μ can be added to the polyethylene powder in an amount of about 30 to about 70% by weight, and sintered in a cylindrical or plate-like form at a temperature of about 220° to about 270° C., preferably 230° to 250° C., for a period of about 70 to about 120 minutes, preferably 80 to 100 minutes, in air. Due to the presence of decomposed gases caused by the addition of the foaming agent during sintering, porous materials having a porosity of about 60 to about 80%, a pore diameter of about 50 to about 150μ and a layer thickness of about 16 mm can be obtained. The porosity and pore diameter of the porous material formed are determined by the amount of the foaming agent added.

It can, of course, be said that the thickness and form are not limited to the above, and can optionally be selected in this invention.

The sintered porous material thus obtained is used as the first filter layer. The fibrous layer, i.e., the second layer, has a layer thickness of about 0.5 to about 5 mm and a porosity of about 70 to about 90% and comprises fibers (e.g., acrylate, polyamide, polyester, etc.) having a critical surface tension of about 25 to about 45 dyne/cm, a water content of about 0.4 to about 0.5% and a fiber diameter of about 5 to about 30μ, is bonded to the outer peripheral surface of the cylindrical first filter layer or to one of two surfaces having a maximum area of the plate-like first filter layer to form a filter of this invention. In this case, both ends of the cylindrical second filter layer, or one or two surfaces of the plate-like second filter layer are bonded to the porous material with an adhesive using, for example, end plates or seal frame.

Mixed fibers comprising about 50% by weight of the fibers as described above and about 50% by weight of fibers (e.g., cotton, hemp, etc.) having a water content of not lower than about 8% (e.g., about 8 to about 15%) and a fiber diameter of about 5 to about 30μ can give a fibrous layer having a layer thickness of about 0.5 to about 5 mm and a porosity of about 80 to about 90% which is capable of being used as the second layer. The thus formed fibrous layer is bonded to the above-described porous material to form an effective filter for oil separation.

Examples of adhesives used include an epoxy resin adhesive comprising material A and material B. As material A, a mixture of about 40 to about 50% by weight of Epikote 828 (a registered trademark for a product of Shell International Chemicals Corp., which has an epoxy equivalent of 190 to 200 and a molecular weight of 360 to 400) and about 50 to about 60% by weight of a filler is suitably used. As material B, a mixture of about 45 to about 55% by weight of a polyamide and about 45 to 55% by weight of a filler is suitably used. A mixture of material A and material B in an amount of about 1:1 by weight is suitably used as the adhesive.

The characteristic features of the filter can be optionally selected depending upon the viscosity and concentration of the oils separated. When an oil having a kinematic viscosity of not more than about 60 centisokes at 37.8° C. (100° F.) is separated from oil containing water in an oil concentration of not more than about 1%, a first filter layer having a pore diameter of about 15 to about 20μ and a porosity of about 60 to about 70%, and a second filter layer having a layer thickness of about 1.5 to about 3 mm and a porosity of about 80 to about 85% comprising fibers having a critical surface tension of about 30 to about 35 dyne/cm, a water content of not lower than about 2% and a fiber diameter of about 15 to about 20μ, are suitably used. When an oil having a kinematic viscosity of not lower than about 60 centistokes at 37.8° C. (100° F.) is separated from oil containing water in an oil concentration of about 1 to about 5%, a first filter layer having a pore diameter of about 40 to about 60μ and a porosity of about 65 to about 75%, and a second filter layer having a layer thickness of about 1.5 to about 3 mm and a porosity of about 80 to about 85% comprising about 50% of fibers having a water content of not lower than about 8% (e.g., about 8 to about 15%) and a fiber diameter of about 5 to about 20μ and about 50% of fibers having a water content of about 0.4%, a critical surface tension of about 40 to about 45 dyne/cm and a fiber diameter of about 10 to about 15μ, are suitably used.

A filter paper treated with resins can also be used as the second filter layer. In this case, a filter paper having a pore diameter of about 50 to about 80μ, a thickness of about 0.6 to about 1 mm, a porosity of about 75 to about 85% and a Frazier air permeability of about 80 to about 110 cc/cm²/sec (at ½ in. H₂O below atmospheric; ASTM D-737-46), which mainly consists of cotton linter having a fiber diameter of about 25 to about 30μ, is impregnated with a 25% acetone solution of a mixture of about 91% by weight of an epoxy resin, such as Epikote 828 (a registered trademark for a product of Shell International Chemicals Corp., which has an epoxy equivalent of 190 to 200 and a molecular weight of 360 to 400), and about 9% by weight of a curing agent, such as triethylenetetramine, and heated at about 130° C. for about 5 hours in the air to form the second filter layer.

Also, the same filter paper as described above can be impregnated with a 20% acetone solution of a mixture of about 78% by weight of isophthalic acid polyester having a melting point of 80° C. and a molecular weight of about 420 to about 700, about 20% by weight of a styrene monomer and about 2% by weight of benzoyl peroxide, and subjected to heating at about 150° C. for about 5 hours in the air, to thereby form the second filter layer.

Still further, the same filter paper as described above can be impregnated into a 10% acetone solution of polymethylmethacrylate having a degree of polymerization of about 1,000, and subjected to heating at about 80° C. for 3 hours in the air to form the second filter layer.

In any case, the impregnation amount of the resin in the filter paper is limited to about 15 to about 20% based on the weight of the filter paper treated.

The following Example specifically illustrate the present invention without limiting the same.

EXAMPLE 1

Powder of ultra-high molecular weight polyethylene having a viscosity average molecular weight of about 1,000,000, an apparent specific gravity of 210 to 230 g/l, particle size of 50 to 200$\mu$, a density of 0.94 g/cc, a melt index of less than 0.01 dg/min. and a melting point of 130° to 138° C. was sintered in a hollow cylindrical form at a temperature of 230° C. for a period of 90 minutes in the air to form a porous material having a layer thickness of 16 mm, a porosity of 65% and a pore diameter of 40$\mu$. A fibrous layer having a layer thickness of 2 mm and a porosity of 82% and comprising 50% of polyester fibers having a water content of 0.4%, a critical surface tension of 43 dyne/cm, a specific gravity of 1.38 and a fiber diameter of 10$\mu$ and 50% of cotton fibers having a water content of 8%, a specific gravity of 1.54 and a fiber diameter of 5 to 20$\mu$ in the form of a tube closed at one end was slipped onto the porous material, an imperforate end plate bonded to the closed end and an end plate with an opening was bonded to the open end of the tube the porous material so as to form an enclosing tube along the long axis thereof and the ends bonded to each other using end plates with an adhesive comprising a 1:1 mixture of Epikote 828 and a polyamide as hereinbefore defined as a curing agent to thereby form a second filter layer of the tubular filter. One of the ends of the tubular filter thus formed was closed and the other was left open (water/oil inlet). The amount of the water treated with this filter was 25 l/min. per 300 cm$^2$ of effective filtering area at a pressure loss of 0.14 Kg/cm$^2$.

When oil-containing water prepared by emulsifying an oil having a kinematic viscosity of 30 to 60 centistokes at 37.8° C. (100° F.) (JIS K2219 First Class No. 1) in a concentration of about 1,000 ppm in the water was treated by the filter, and the remaining oil in the thus treated water was extracted with carbon tetrachloride, it was ascertained by non-dispersible infrared absorption method that the oil was separated to the extent that its concentration in the water became 20 ppm.

EXAMPLE 2

The same polyethylene powder as was used in Example 1 was mixed with polytetrafluoroethylene powder having an apparent specific gravity of 300 to 500 g/l, a specific gravity of 2.3 and a particle size of 5$\mu$ (more than 50% of the particles) in ratio of 3:1 by weight, and sintered in a hollow cylindrical form at a temperature of 230° C. for a period of 90 minutes in the air to form a porous material having a layer thickness of 16 mm, a porosity of 64% and a pore diameter of 20$\mu$. A fibrous layer having a layer thickness of 2 mm and a porosity of 85% and comprising fibers having a water content of 2%, a critical surface tension of 32 dyne/cm, a specific gravity of 1.14 to 1.17 and a fiber diameter of 15 to 80$\mu$ was slipped on the porous material so as to form an enclosing tube and both ends thereof bonded to each other as in Example 1 using the same adhesive as was used in Example 1 to thereby form a second filter layer of the tubular filter. One of the ends of the tubular filter thus formed was thus closed and the other was left open (water/oil inlet). The amount of water treated with the resulting filter was 20 l/min. per 300 cm$^2$ of effective filtering area at a pressure loss of 0.14 Kg/cm$^2$.

When oil-containing water prepared by emulsifying an oil having a kinematic viscosity of 2 to 3 centistokes at room temperature (i.e., about 20°–30° C.) (JIS K2203-1) in a concentration of about 4,500 ppm in the water was treated by the filter, and the remaining oil in the thus treated water was extracted with carbon tetrachloride, it was ascertained by a non-dispersible infrared absorption method that the oil was separated to the extent that its concentration in the water became 3.5 ppm.

EXAMPLE 3

The same polyethylene powder as was used in Example 1 was mixed with a polyimide powder having a specific gravity of 1.4, an apparent specific gravity of 400 g/l and a particle size of 5$\mu$ (more than 50% of the particles) in ratio of 3:1 by weight, and sintered in a hollow cylindrical form at a temperature of 230° C. for a period of 90 minutes in the air to form a porous material having a layer thickness of 16 mm, a pore diameter of 15$\mu$ and a porosity of 60%. The same fibrous layer as was used in Example 2 was bonded to the porous material as in Example 2 as the second filter layer to form a filter. One of the ends of the tubular filter thus formed was closed and the other was left open (water/oil inlet). The amount of water treated with the resulting filter was 20 l/min. per 300 cm$^2$ of effective filtering area at a pressure loss of 0.14 Kg/cm$^2$.

When oil-containing water prepared by emulsifying an oil having a kinematic viscosity of 2 to 3 centistokes at room temperature (JIS K2203-1) in a concentration of about 3,000 ppm in the water was treated by the filter, and the remaining oil in the thus treated water was extracted with carbon tetrachloride, it was ascertained by a non-dispersible infrared absorption method that the oil was separated to the extent that its concentration in the water became 5.6 ppm.

EXAMPLE 4

The same polyethylene powder as was used in Example 1 was mixed with diatomaceous earth having a specific gravity of 2.1, an apparent specific gravity of 250 g/l and a particle size of 3 to 40$\mu$ in ratio of 3:1 by weight, and sintered in a hollow cylindrical form at a temperature of 230° C. for a period of 90 minutes in the air to form a porous material having a layer thickness of 16 mm, a pore diameter of 15$\mu$ and a porosity of 67%. The same fibrous layer as was used in Example 2 was bonded to the porous material as in Example 2 as the second filter layer to form a filter. One of the ends of the tubular filter thus formed was closed and the other was left open (water/oil inlet). The amount of water treated with the filter thus formed was 25 1/min. per 300 cm² of effective filtering area at a pressure loss of 0.14 Kg/cm².

When oil-containing water prepared by emulsifying an oil having a kinematic viscosity of 30 to 60 centistokes at 37.8° C. (100° F.) (JIS K2219 First Class No. 1) in a concentration of about 5,000 ppm in the water was treated by the filter, and the remaining oil in the thus treated water was extracted with carbon tetrachloride, it was ascertained by a non-dispersible infrared absorption method that the oil was separated to the extent that its concentration in the water became 3.6 ppm.

EXAMPLE 5

The same polyethylene powder as was used in Example 1 was mixed with sodium chloride having a specific gravity of 2.16, an apparent specific gravity of 1,020 g/l and a particle size of 400μ (more than 50% of the particles) in ratio of 2:3 by weight, and sintered in a hollow cylindrical form at a temperature of 230° C. for a period of 90 minutes in the air, followed by washing with water to dissolve the sodium chloride thereby forming a porous material having a layer thickness of 16 mm, a porosity of 70% and a pore diameter of 50μ. The same fibrous layer as was used in Example 1 was bonded to the porous material as in Example 1 as the second filter layer to form a filter. One of the ends of the tubular filter thus formed was closed and the other was left open (water/oil inlet). The amount of water treated with the resulting filter was 30 1/min. per 300 cm² of effective filtering area at a pressure loss of 0.14 Kg/cm².

When oil-containing water prepared by emulsifying an oil having a kinematic viscosity of 250 centistokes at 37.8° C. (100° F.) (JIS K2205 Third Class No. 2) in a concentration of about 20,000 ppm in the water was treated by the filter and the remaining oil in the thus treated water was extracted with carbon tetrachloride, it was ascertained by a non-dispersible infrared absorption method that the oil was separated to the extent that its concentration in the water became 80 ppm.

EXAMPLE 6

A filter paper having a pore diameter of 50μ, a thickness of 0.7 mm, a porosity of 80% and a Frazier air permeability of 94 cc/cm²/sec (at ½ in. H₂O below atmospheric; ASTM D-737-46), which mainly consisted of cotton linter having a fiber diameter of 25 to 30μ, was impregnated with a 25% acetone solution of a mixture of 91% by weight of Epikote 828 as hereinbefore defined and 9% by weight of triethylenetetramine used as a curing agent and heated at 130° C. for 5 hours in the air. The thus treated filter paper was shaped into a cylindrical form, and fitted on the same cylindrical porous material comprising a polyethylene-diatomaceous earth mixed powder as was prepared in Example 4. Both ends thereof were then bonded to each other using end plates as in Example 1 using the same adhesive as was used in Example 1 following the procedure of Example 1 to form a filter. One of the ends of the tubular filter thus formed was closed and the other was left open (water/oil inlet).

When oil-containing water prepared by emulsifying an oil having a kinematic viscosity of 1.5 to 1.7 centistokes at the 37.8° C. (100° F.) (JIS K2203-1) in a concentration of about 3,000 ppm in water was treated by the thus formed filter, and the remaining oil in the thus treated water was extraced with carbon tetrachloride, it was ascertained by a non-dispersible infrared absorption method that the oil was separated to the extent that its concentration in the water became 4 ppm.

EXAMPLE 7

The same filter paper as was used in Example 6 was impregnated with a 20% acetone solution of a mixture comprising 78% by weight of isophthalic acid polyester having a melting point of 80° C. and a molecular weight of 420 to 700, 20% by weight of styrene monomer and 2% by weight of benzyl peroxide, and heated at 150° C. for 5 hours in the air. The thus treated filter paper was then shaped into a hollow sylindrical form, and fitted on the same cylindrical porous material comprising a polyethylene-diatomaceous earth mixed powder as was prepared in Example 4. Both ends thereof were then bonded to each other using end plates with the same adhesive as was used in Example 1 following the procedure of Example 1 to form a filter. One of the ends of the tubular filter thus formed was closed and the other was left open (water/oil inlet).

When oil-containing water prepared by emulsifying an oil having a kinematic viscosity of 2 to 3 centistokes at room temperature (JIS K2203-1) in a concentration of about 5,000 ppm in the water was treated by the thus formed filter, and the remaining oil in the thus treated water was extracted with carbon tetrachloride, it was ascertained by a non-dispersible infrared absorption method that the oil was separated to the extent that its concentration in the water became 5.5 ppm.

EXAMPLE 8

The same filter paper as was used in Example 6 was impregnated with a 10% acetone solution of polymethylmethacrylate having a degree of polymerization of about 1,000, and heated at 80° C. for 3 hours in the air. The thus treated filter paper was shaped into a hollow cylindrical form, and fitted on the same porous material comprising a polyethylene-diatomaceous earth mixed powder as was prepared in Example 4. Both ends thereof were then bonded to each other using end plates with the same adhesive as was used in Example 1 to form a filter following the procedure of that Example. One of the ends of the tubular filter thus formed was closed and the other was left open (water/oil inlet).

When oil-containing water prepared by emulsifying an oil having a kinematic viscosity of 30 to 60 centistokes at 37.8° C. (100° F.) (JIS K2219 First Class No. 1) in a concentration of about 2,500 ppm in the water was treated by the thus formed filter, and the remaining oil in the thus treated water was extracted with carbon tetrachloride, it was ascertained by a non-dispersible infrared absorption method that the oil was separated to the extent that its concentration in the water became 2.0 ppm.

EXAMPLE 9

A porous fluorine resin sheet comprising polytetrafluoroethylene and having a thickness of 1 mm and a pore diameter of 20μ was tightly wrapped around a stainless steel punching plate having a thickness of 0.8 mm and a porosity of 58% which had been formed into a hollow cylinder with a diameter of 58 mm and a length of 250 mm so that it formed a fluorine resin layer of a thickness of 5 mm. Then, a punching plate of the same quality formed into a cylinder with a diameter of 70 mm and a length of 250 mm was fitted as a supporting member on the resulting assembly to form a first filter layer. Further, the same fibrous layer as was prepared in Example 2 was fitted on the first filter layer as a second layer, both ends of which were then bonded to each other using end plates with the same adhesive as was used in Example 1 (and following the procedure of that Example) to form a filter. One of the ends of the tubular filter this formed was closed and the other was left open (water/oil inlet). The amount of water treated with the thus formed filter was 15 l/min. per 300 cm$^2$ of effective filtering area at a pressure loss of 0.14 Kg/cm$^2$.

When oil-containing water prepared by emulsifying an oil having a kinematic viscosity of 2 to 3 centistokes at room temperature (JIS K2203-1) at a concentration of about 1,500 ppm was treated by the filter, and the remaining oil in the thus treated water was extracted with carbon tetrachloride, it was ascertained by a non-dispersible infrared absorption method that the oil was separated to the extent that its concentration in the water became 3.6 ppm.

While the invention has been described in detail and with reference to specific embodiments thereof, it will be apparent to one skilled in the art that various changes and modifications can be made therein without departing from the spirit and scope thereof.

What is claimed is:

1. An oil-water separation filter, which comprises (i) a first filter layer of a porous base material and (ii) a second fibrous filter layer, said first filter layer (i) being bonded to said second fibrous filter layer (ii), said base material comprising a sintered polyethylene powder and said fibrous filter layer having a thickness of about 0.5 to about 5 mm and a porosity of about 70 to about 90% and being comprised of (a) fibers having a water content of about 0.4 to about 5%, a critical surface tension of about 25 to about 45 dyne/cm and a fiber diameter of about 5 to about 30µ or being comprised of (b) a mixture of said fibers (a) and fibers having a water content of about 8 to about 15% and a fiber diameter of 5 to about 30µ.

2. The oil-water separation filter of claim 1, wherein said porous material further contains a fluorocarbon powder or a polyimide powder.

3. The oil-water separation filter of claim 2, wherein said fluorocarbon powder is a tetrafluoroethylene powder having an apparent specific gravity of 300 to 500 grams per liter, a specific gravity of about 2.25 to about 2.3, and more than 50% of the particles of said powder have a particle size of 5 microns.

4. The oil-water separation filter of claim 1, wherein said porous material further contains an inorganic material selected from the group consisting of sintered clay, alumina, activated carbon, diatomaceous earth, calcium carbonate, magnesium carbonate and magnesium hydroxide.

5. The oil-water separation filter of claim 1, wherein said porous material further contains sodium chloride, sodium bicarbonate or antimony bicarbonate.

6. The oil-water separation filter of claim 1 wherein said polyethylene in said sintered polyethylene has a viscosity average molecular weight of 700,000 to 4,000,000, a density of 0.94 to 0.97 g/cc, a melt index of 0.01 dg/min. or less and a melting point of 130° to 138° C.

7. A process for separating oil from water containing oil, which comprises flowing the water containing oil through an oil-water separation filter comprising (1) a porous material comprising a sintered polyethylene powder bonded to (2) a fibrous layer having a thickness of about 0.5 to about 5 mm and a porosity of about 70 to about 90% comprising fibers having a water content of about 0.4 to about 5%, a critical surface tension of about 25 to about 45 dyne/cm and a fiber diameter of about 5 to about 30µ or a mixture of said fibers and fibers having a water content of about 8 to about 15% and a fiber diameter of 5 to about 30µ.

8. The separation process of claim 7, wherein said porous material further contains a tetrafluoroethylene powder or a polyimide powder.

9. The separation process of claim 8, wherein said tetrafluoroethylene powder has an apparent specific gravity of 300 to 500 grams per liter, a specific gravity of 2.25 to about 2.3, and more than 50% of the particles of said powder have a particle size of 5 microns.

10. The separation process of claim 7, wherein said porous material further contains an inorganic material selected from the group consisting of sintered clay, alumina, activated carbon, diatomaceous earth, calcium carbonate, magnesium carbonate and magnesium hydroxide.

11. The separation process of claim 7, wherein said porous material further contains sodium chloride, sodium bicarbonate or antimony bicarbonate.

12. The separation process of claim 7, wherein said fibrous layer comprises a filter paper impregnated with an epoxy resin, a polyester resin or an acrylate resin.

* * * * *